United States Patent [19]

Lease

[11] 4,173,298
[45] Nov. 6, 1979

[54] ROTARY FEED CUP HAVING A SPACER AND A PIVOTED SEAL

[75] Inventor: Robert D. Lease, Bismarck, N. Dak.

[73] Assignee: Clark Equipment Company, Buchanan, Mich.

[21] Appl. No.: 839,951

[22] Filed: Oct. 6, 1977

[51] Int. Cl.² ................. G01F 11/10; G01F 11/24
[52] U.S. Cl. ............................. 222/368; 222/414
[58] Field of Search ............ 222/185, 233, 269, 270, 222/273, 274, 368, 410, 414, 547, 564, 542

[56] References Cited

U.S. PATENT DOCUMENTS

| 176,719 | 4/1876 | Westcott | 222/268 |
|---|---|---|---|
| 1,178,571 | 4/1916 | Bozard | 222/283 |
| 1,705,234 | 3/1929 | Brennan | 222/269 |
| 1,814,483 | 7/1931 | Morgan | 222/304 X |
| 2,548,245 | 4/1951 | Stevens et al. | 222/368 X |
| 2,698,704 | 1/1955 | Beasley | 222/414 X |
| 3,140,017 | 7/1964 | Burch | 222/274 X |
| 3,252,629 | 5/1966 | Quick et al. | 222/274 |
| 3,489,321 | 1/1970 | Kirschman | 222/368 |
| 3,606,965 | 9/1971 | Cortelyou et al. | 222/315 X |

Primary Examiner—Robert J. Spar
Assistant Examiner—Fred A. Silverberg
Attorney, Agent, or Firm—Ernst H. Ruf

[57] ABSTRACT

A feed cup mechanism, of the type generally used in grain drills, includes interchangeable feed wheels of various seed metering circumferential surfaces, of various tooth sizes or surface irregularities, and of various thicknesses. Interchangeable spacers of various thicknesses and of various peripheral sizes complement respective ones of the feed wheels to provide a metering passage having a suitable radial thickness for a particular type of seed and having a suitable width for metering a suitable quantity of seed. A pivoted seal is provided which cooperates with the various sizes of the feed wheels and with complementary ones of the spacers to prevent seed from passing from a receiving opening to a discharge spout except through the metering passage. Optionally, the pivoted seal is oscillated to agitate the incoming seed and thereby to provide more uniform metering of the seed.

5 Claims, 11 Drawing Figures

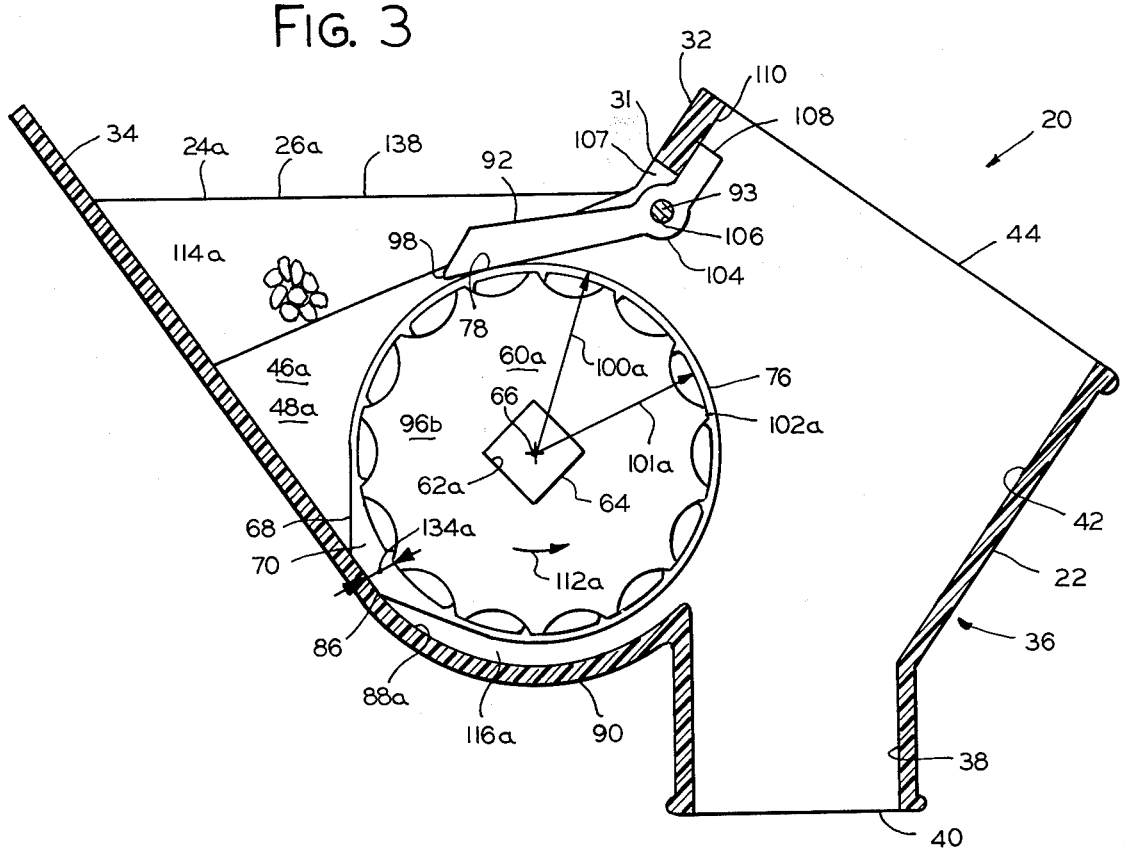
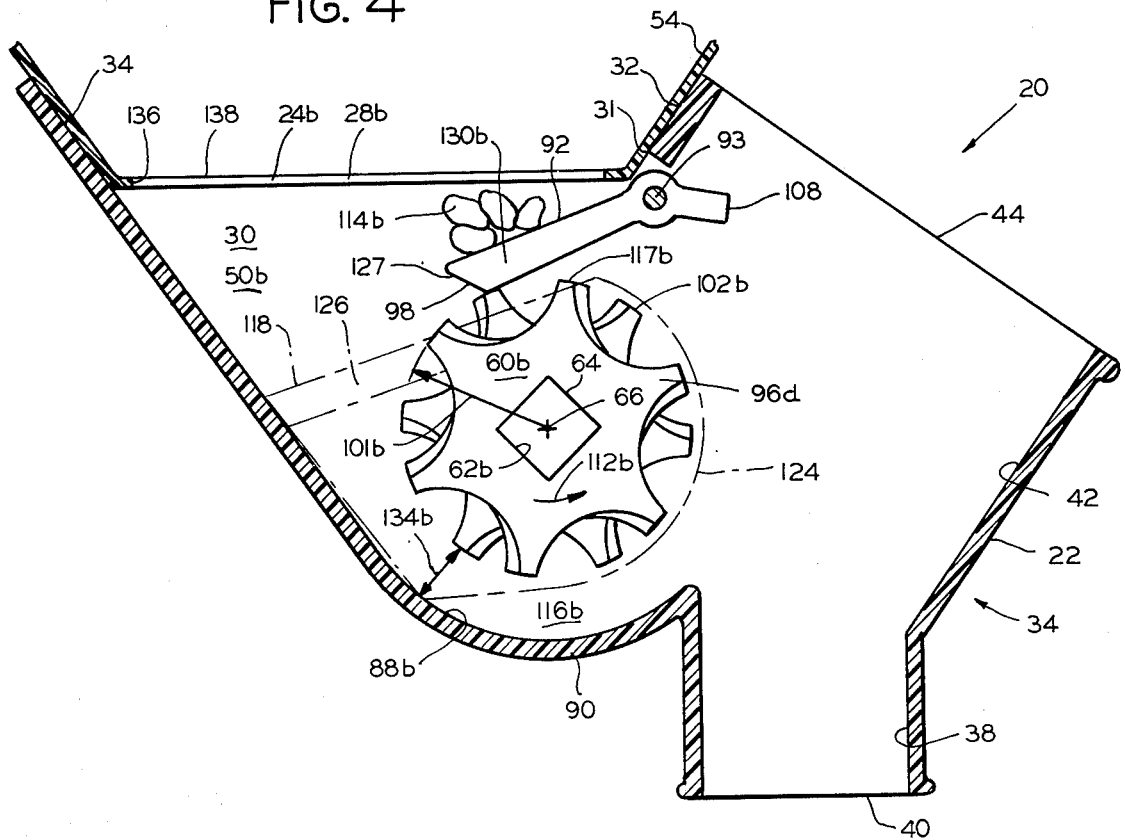

ROTARY FEED CUP HAVING A SPACER AND A PIVOTED SEAL

BACKGROUND OF THE INVENTION

1. Field of the Invention

The present invention relates generally to material fielding mechanism, and more particularly to feed cup mechanisms of the type which are commonly used on grain drills.

2. Description of the Prior Art

The prior art in feed cup mechanisms of the type generally used on grain drills includes U.S. Patents as follows: U.S. Pat. Nos. Jessup 32,627; Jessup Re 2,782; Jessup Re 5,917; Westcott 176,719; Regan Re 8,819; Keedy 337,268; Bozard 899,711; Kirschmann 3,489,321; and Patterson et al. 3,680,742.

Of particular interest is Westcott, U.S. Pat. No. 176,719, in which various widths of a seed wheel can be exposed to the grain to change the feeding rate. A movable gate moves in and out of the feed cup to complement the width of the feed wheel that is exposed to the interior of the feed cup. This type of feed cup mechanism is still used in a variation in which the movable gate may be rotated 90 degrees to allow rapid emptying and cleaning of the feed cup.

Westcott's device has the advantage of ease in modifying the rate of seed being sown; but it has the disadvantage of a constant tooth size on the feed wheel, wheras smaller teeth are needed for small seeds and larger teeth are needed for large seeds. Also there is no provision for changing the radial thickness of the metering passage, so small seeds are not accurately metered and large seeds tend to be broken as they traverse the metering passage.

Kirschmann, U.S. Pat. No. 3,489,321, is also of particular interest in that Kirschmann moves the drive shaft to effect a change in the radial thickness of the metering passage to provide more accurate metering of fine seed and to reduce the breakage of large seed.

SUMMARY OF THE INVENTION

In accordance with the broader aspects of this invention, there is provided a feed cup mechanism which includes a feed cup having a receiving opening for receiving seed, having a discharge spout for gravity discharging of seed, and having drive shaft apertures through the side walls thereof that are intermediate of the receiving opening and the discharge spout. A drive shaft is rotatably inserted through the drive shaft aperture and carries a feed wheel thereupon that includes a seed metering surface.

A pivoted seal is mounted in the feed cup intermediate of the receiving opening and the discharge spout, and includes a swinging end that is gravity pressed proximal to the seed metering circumferential surface of the feed wheel to prevent seed from passing from the receiving opening to the discharge spout except through a metering passage that is provided between the seed metering circumferential surface of the feed wheel and a curvilinear inner surface of the feed cup.

Feed wheels of various seed metering circumferential surfaces, of various surface irregularities of the respective seed metering circumferential surfaces, and of various widths, are provided for handling different sizes of seeds and for selectively adjusting the feed rates.

Interchangeable spacers, having various thicknesses and various outer peripheral sizes, are provided to complement respective ones of the feed wheels to make up a total width which is substantially equal to the inside width of the feed cup.

The pivoted seal has a width which is substantially equal to the combined width of paired ones of the feed wheels and spacers; and the swinging end of the pivoted seal cooperates with both the seed metering circumferential surface of a feed wheel and with a portion of the outer periphery of the paired spacers to effectively provide a seal between the receiving opening and the discharge spout.

In one embodiment, the swinging end of the pivoted seal rests against the outer periphery of the spacer and does not touch the seed metering circumferential surface of the feed wheel, but is proximal thereto for effective sealing.

In another embodiment, the swinging end of the pivoted seal rides against the seed metering circumferential surface of the feed wheel and is actuated upwardly by surface irregularities of the seed metering circumferential surface, thereby agitating the seed that is above the pivoted seal to prevent seed from bridging across the receiving opening, and thereby improving the accuracy of seed metering.

It is a first object of the present invention to provide a feed cup mechanism having interchangeable feed wheels of various diameters to provide metering passages of larger radial size for larger seeds and of smaller radial size for smaller seeds.

It is a second object of the present invention to provide complementary width feed wheels and spacers to change the width of the metering passage and thereby to change the rate of seed metering therethrough.

It is a third object of the present invention to provide a self-adjusting seal that cooperates with the seed metering periphery of various diameters of feed wheels to prevent seed from flowing from the receiving opening to the discharge spout except through the metering passage.

It is a fourth object of the present invention to provide a pivoted seal that cooperates with both the seed metering periphery of the feed wheel and with the outer periphery of the spacer to prevent seed from flowing from the receiving opening to the discharge spout except through the metering passage.

It is a fifth object of the present invention to provide means for agitating the seed that is proximal to the receiving opening of the feed cup to prevent seed from bridging thereacross.

It is a sixth object of the present invention to cam actuate the pivoted seal by contact with surface irregularities of the circumferential metering surface of the feed wheel and thereby to agitate the incoming seed.

These and other advantages and objects of the present invention will be readily apparent by referring to the following detailed description wherein:

BRIEF DESCRIPTION OF THE DRAWINGS

FIG. 3 is a cross-section of the feed cup mechanism of FIG. 1, taken substantially as shown by section line 3—3 of FIG. 1;

FIG. 4 is a cross-section of the feed cup mechanism of FIG. 1, taken substantially as shown by section line 4—4 of FIG. 1;

DETAILED DESCRIPTION OF THE PREFERRED EMBODIMENT

Figure 1:
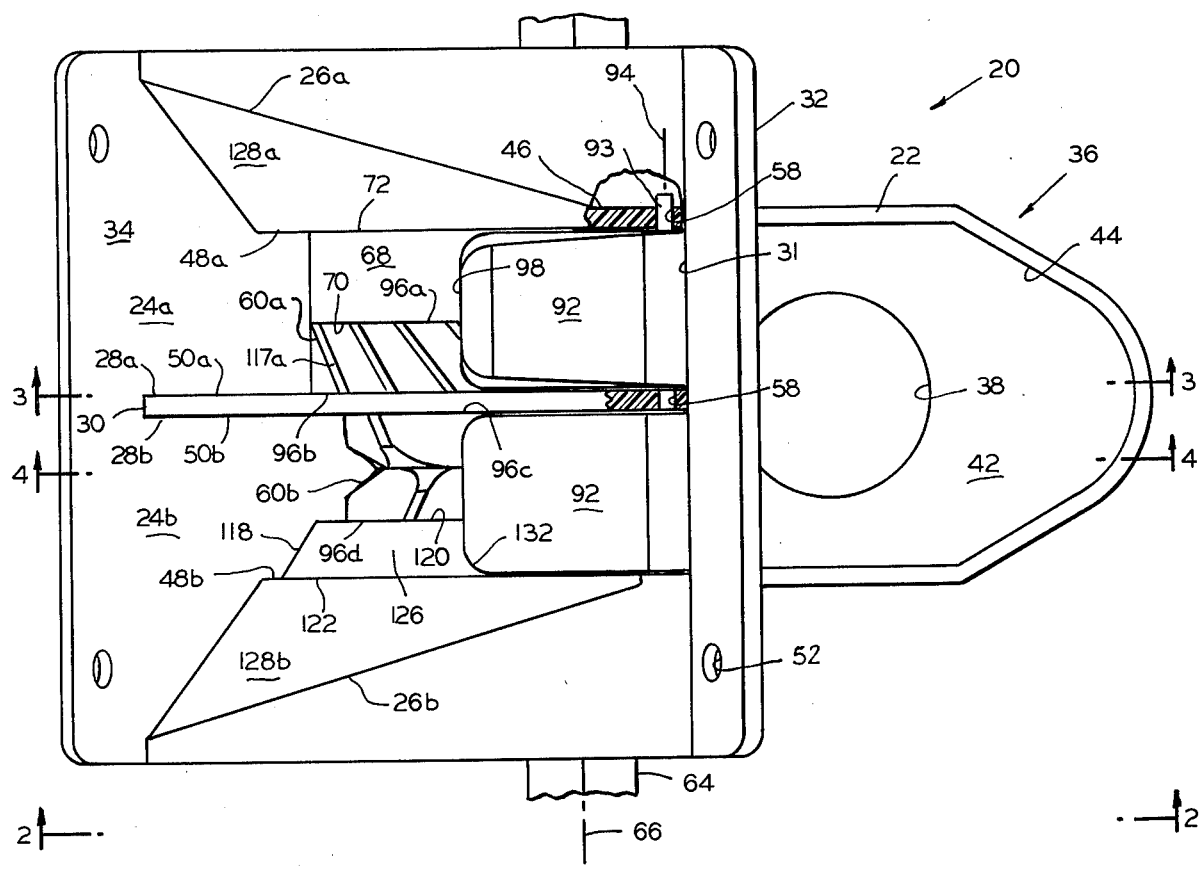
FIG. 1 is a top view of the feed cup mechanism.

Referring now to FIGS. 1–4, a feed cup mechanism 20 includes a feed cup 22 having receiving openings 24a and 24b which are bounded by edges 26a and 26b, edges 28a and 28b of a dividing wall 30, respective portions of an edge 31 of a transverse structural member or flange 32, and a portion of a flange and end wall 34.

The feed cup 22 includes a discharge spout means 36 which includes a discharge spout 38 which is located proximal to a bottom portion 40 of the feed cup 22 and which includes a discharge collector 42 having an auxiliary inlet opening 44 at the upper end thereof. The use of an auxiliary inlet opening, such as the auxiliary inlet opening 44, is common in the industry and is sometimes used as an inlet for applying fertilizer with the seed that is being sown. The auxiliary inlet opening 44 is also useful for observing the rate of flow of the seed being sown.

The feed cup 22 further includes side walls 46a and 46b which respectively include inner surfaces 48a and 48b. The inner surfaces 48a and 48b cooperate respectively with inner surfaces 50a and 50b of the dividing wall 30 to form a first pair of parallel and spaced-apart inner surfaces, 48a and 50a, and to form a second pair of parallel and spaced-apart inner surfaces 48b and 50b.

Finally, the feed cup 22 includes holes 52 in the flange 32 and in the flange and end wall 34 for attaching the feed cup mechanism 20 to a hopper 54 (FIG. 4), a drive shaft aperture 56b in the side wall 46b and similar and substantially coaxial drive shaft apertures (not shown) in the side wall 46a and in the dividing wall 30, and a pivot pin hole 58 which extends through the side wall 46a, through the dividing wall 30, and through the side wall 46b.

In addition to the feed cup 22, the feed cup mechanism 20 includes feed wheels 60a and 60b which include square hub openings 62a and 62b therethrough. A square drive shaft 64, which includes an elongated longitudinal axis 66, is inserted through the drive shaft aperture 56b, both through and into driving engagement with the hub openings 62a and 62b and out through the side wall 46a. The drive shaft 64 is rotationally and drivingly mounted for rotation (not shown) about the elongated longitudinal axis 66 in any of the ways which are common to the art and which do not constitute a portion of the present invention.

Referring now to FIGS. 1–3, 8, and 9, the feed cup mechanism 20 includes a spacer 68 having a planar spacing surface 70, having an opposite surface 72, having a tubular projection or attaching projection 74a, having an outer periphery 76 that includes a portion 78 that is disposed substantially orthogonal to the planar spacing surface 70, having a drive shaft opening 80a, having a retaining collar 82a on the tubular projection 74a, and having resiliency slots 84a in the tubular projection 74a. The spacer 68 is positioned within the feed cup 22 as shown by FIG. 3 so that a cam-like projection 86 of the outer periphery 76 engages a curvilinear inner surface 88a of a connecting wall 90 of the feed cup 22. The spacer 68 is retained within the previously mentioned drive shaft aperture (not shown, similar to the aperture 56b) in the wall 46a by the tubular projection 74a and by the retaining collar 82a thereof.

Referring now to FIGS. 1–3, 6, and 7, a pivoted seal 92 cooperates with a pivot pin 93 to provide a pivoted seal means or self-adjusting seal means, the pivot pin 93 having a pivotal axis 94 that is substantially parallel to the elongated longitudinal axis 66 of the drive shaft 64.

Planar side surfaces 96a and 96b of the feed wheel 60a cooperate with respective ones of the planar spacing surface 70 of the spacer 68 and the inner surface 50a of the dividing wall 30, and the opposite surface 72 of the spacer 68 cooperates with the inner surface 48a of the side wall 46a to substantially seal the space between the inner surface 48a and the inner surface 50a.

The pivoted seal 92 includes a swinging end 98 that pivots downwardly into substantially tangential contact with the portion 78 of the outer periphery 76 of the spacer 68; and, since the portion 78 is at a radius 100a that is slightly greater than a radius 101a of the feed wheel 60a, the swinging end 98 rests on the portion 78 and is proximal to a seed metering circumferential surface 102a of the feed wheel 60a for effective sealing from the receiving opening 24a to the discharge spout 38, but the pivoted seal 92 does not touch the feed wheel 60a.

Referring now to FIG. 3, the pivoted seal 92 includes a cylindrical portion 104 that coaxially surrounds the pivot pin 93 and a pivot pin hole 106 through the cylindrical portion 104. As can be clearly seen in FIG. 3, a gap 107 between the cylindrical portion 104 and the structural member 32 will occur because of required manufacturing tolerances. Since very small seeds would be able to traverse from the receiving opening 24a to the discharge spout 38 via the gap 107, a sealing tail 108 of the pivoted seal 92 is provided, the sealing tail 108 projecting upwardly into substantially sealing contact with a distal surface 110 of the structural member 32, the distal surface 110 being distal from the receiving opening 24a.

In operation, the feed wheel 60a rotates as shown by an arrow 112a metering seed 114a through a feed passage or metering passage 116a that is formed radially intermediate of the seed metering circumferential surface 102a and the curvilinear inner surface 88a to the discharge spout 38.

Figure 2:
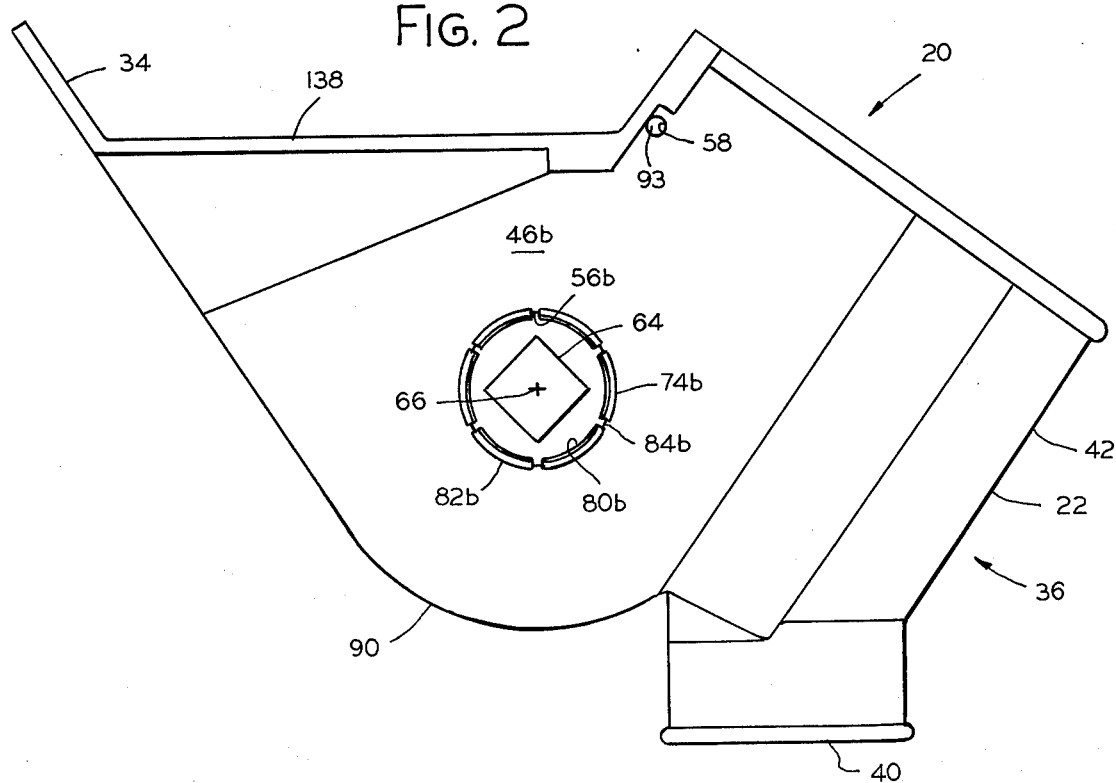
FIG. 2 is a side elevation of the feed cup mechanism of FIG. 1, taken substantially as shown by view line 2—2 of FIG. 1.

Referring now to FIGS. 1, 2, 4–7, and 10–11, a feed wheel 60b includes planar side surfaces 96c and 96d, a hub opening 62b, a seed metering circumferential surface 102b that includes surface irregularities 117b, and is drivingly mounted onto the drive shaft 64. A spacer 118 includes a planar spacing surface 120, an opposite surface 122, a tubular projection or attaching projection 74b, a drive shaft opening 80b, a retaining collar 82b on the tubular projection 74b, and resiliency slots 84b in the attaching projection 74b. The spacer 118 also includes an outer periphery 124 having a beveled top surface 126. The spacer 118 is detachably secured to the wall 46b of the feed cup 22 by the tubular projection 74b, as shown in FIG. 2, and the beveled top surface 126 is positioned substantially as shown by the phantom lines in FIG. 4.

Referring now to FIGS. 1 and 4, the pivoted seal 92 is assembled with the sealing tail 108 pointing downwardly, and with an end bevel 127 also pointing downwardly. As can be seen in FIG. 4, the beveled top surface 126 of the outer periphery 124 of the spacer 118 is lower than, or nearer the longitudinal axis 66 than, the surface irregularities or metering teeth 117b of the seed metering circumferential surface 102b of the feed wheel 60b; so that, rotation of the feed wheel 60b, in the direction as shown by an arrow 112b, is effective to cam actuate the swinging end 98 of the pivoted seal 92 upwardly agitating seed 114b and thereby preventing the seed 114b from bridging across the receiving opening 24b from a transition surface 128b of FIG. 1 to the dividing wall 30.

Referring now to FIGS. 1, 4, 6, and 7, sides 130a and 130b of the pivoted seal 92 are beveled to reduce the area of contact between the sides 130a and 130b and respective ones of the inner surfaces 50b and 48b. The reason for this bevel is to reduce the tendency of portions of stalks or leaves from wedging between the pivoted seal 92 and adjacent ones of the inner surfaces 48b and 50b. The pivoted seal 92 also includes radiused ends 132 which are also helpful in preventing the wedging of stalks or leaves.

Referring again to FIGS. 1, 3, and 4, the feed cup mechanism 20 is of the type generally designated as "double run" in which one of the receiving openings, 24a or 24b, is covered by a removable cover (not shown) so that the feed cup mechanism 20 may be used to feed a relatively fine seed or to feed a relatively coarse seed by merely positioning the cover (not shown) over the one of the receiving openings, 24a or 24b, that is not being used. This double run feature of the feed cup mechanism is common to the art and is not a part of the present invention. Also, features which are not a part of the present invention, but which are common to this type of mechanism, include a cover for covering both of the receiving openings, 24a and 24b, at the same time, and a cover for covering the auxiliary inlet opening 44 to prevent wind from blowing very fine seed out of the inlet opening 44.

Figure 5:
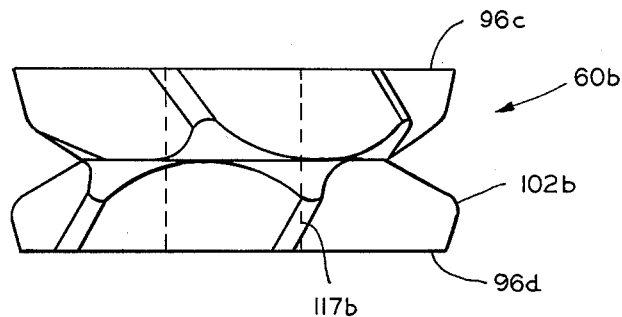
FIG. 5 is a top view of the feed wheel of FIG. 4, taken substantially as shown in FIG. 1.
Figure 6:
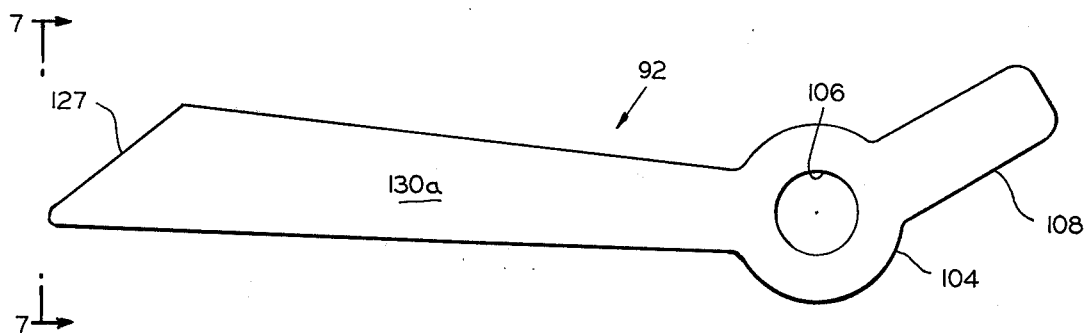
FIG. 6 is a side view of the pivoted seal of FIG. 3, taken substantially as shown in FIG. 3.
Figure 7:
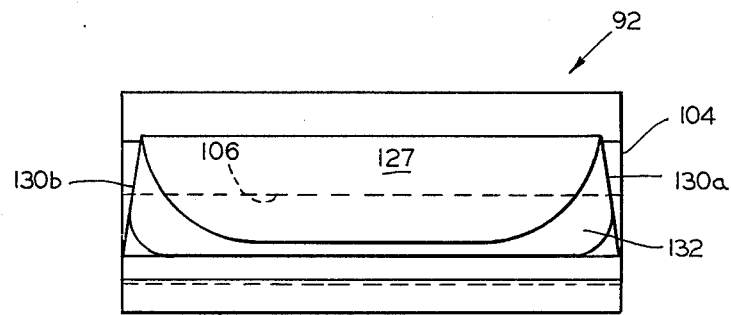
FIG. 7 is an end view of the pivoted seal of FIG. 6, taken substantially as shown by view line 7—7 of FIG. 6.
Figure 9:
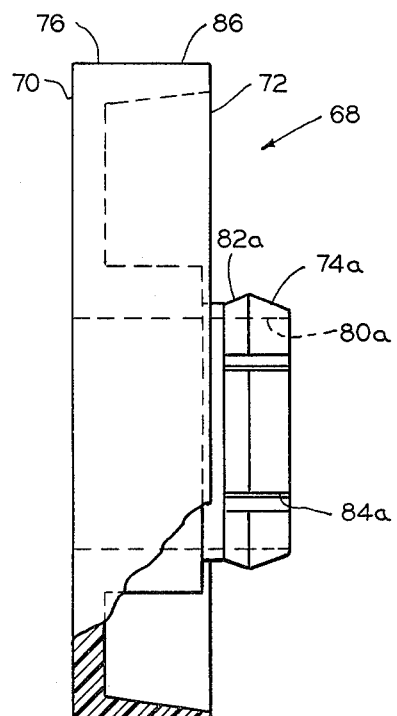
FIG. 9 is a side view of the spacer of FIG. 8, taken substantially as shown by view line 9—9 of FIG. 8.
Figure 8:
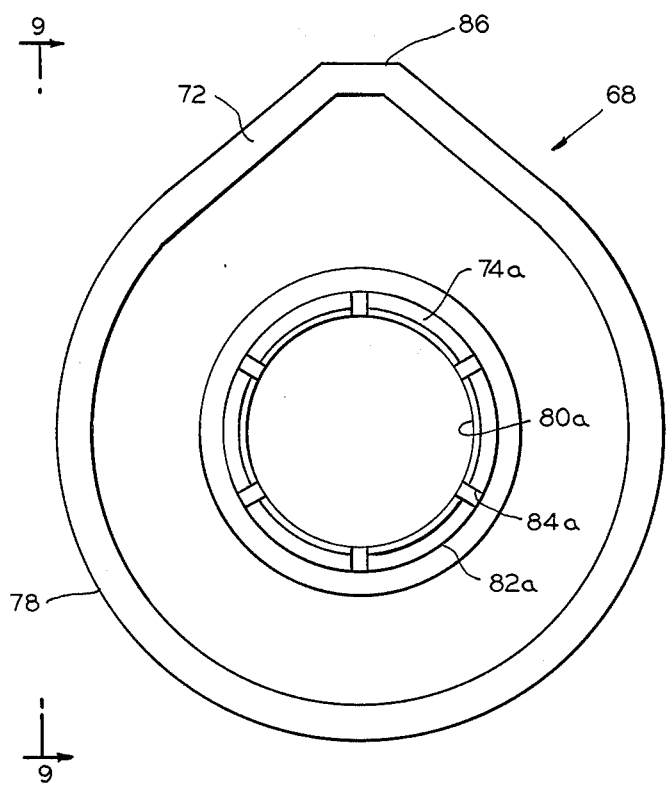
FIG. 8 is a plan view of the spacer of FIG. 3.
Figure 11:
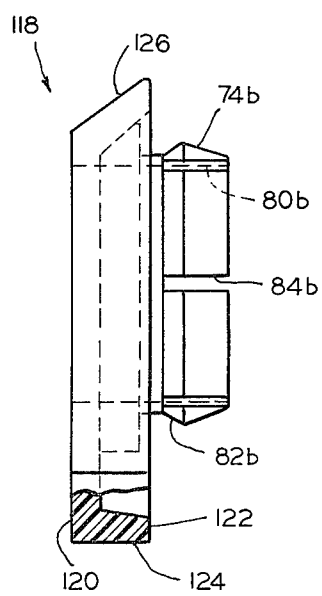
FIG. 11 is an end view of the spacer of FIG. 10, taken substantially as shown by view line 11—11 of FIG. 10.
Figure 10:
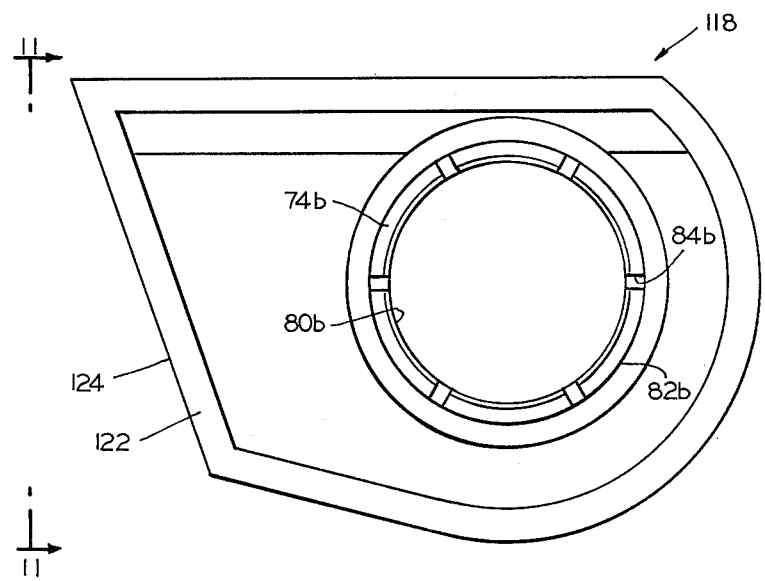
FIG. 10 is a plan view of the spacer of FIG. 1 which is shown by phantom lines in FIG. 4.

Referring now to FIGS. 1 and 5, the feed wheel 60a includes helically shaped teeth or surface irregularities 117a. The feed wheel 60b includes two sets of helically shaped teeth or surface irregularities 117b which are disposed to direct the seed 114b (FIG. 4) inwardly away from both the inner surface 48b of the side wall 46b and away from the inner surface 50b of the dividing wall 30. The purpose of this double helix or herringbone shape of the surface irregularities 117b of the feed wheel 60b are to more evenly distibute the seed and to reduce wear on the inner surfaces 48b and 50b.

In summary, the present invention provides interchangeable feed wheels, such as the feed wheels 60a and 60b having: metering teeth or surface irregularities, 117a and 117b, on the seed metering circumferential surfaces, 102a and 102b, thereof which are designed for accurate metering of the size of the seed being sown; varying circumferential surfaces or radii of feed wheels, such as radii 101a and 101b, for adjusting the radial dimensions of the metering passages, and for accurately metering the seed while minimizing breakage, such as radial dimensions 134a and 134b of the metering passages 116a and 116b; various widths of feed wheels, such as the feed wheels 60a and 60b which are sized in accordance with the desired metering rate for the type of seed being sown.

The present invention also includes spacers such as the spacers 68 and 118, for cooperating with various widths of the feed wheels, such as the feed wheels 60a and 60b, to effectively seal between inner surfaces such as the inner surfaces 48a and 50a.

The present invention also provides a self-adjusting seal means or pivoted seal means that includes a pivoted seal 92 and a pivot pin 93. In one embodiment, as exemplified in FIG. 3, the swinging end 98 of the pivoted seal 92 rests on a portion 78 of the spacer 68 and provides only a sealing function. In another embodiment, as exemplified in FIG. 4, the swinging end 98 of the pivoted seal 92 is cam actuated upardly by surface irregularities 117b of the feed wheel 60b thereby agitating seed 114b and preventing bridging of the seed 114b across from the transition surface 128b (FIG. 1) to the dividing wall 30, and also preventing bridging of the seed 114b across an opening 136 of the hopper 54 which is secured to a top portion 138 of the feed cup mechanism 20.

While only two embodiments of the present invention have been described in detail, it will be understood that these detailed descriptions are intended to be illustrative only and that various modifications and changes may be made to the present invention without departing from the spirit and scope of it. Therefore the limits of the present invention should be determined from the appended claims.

What is claimed is:

1. A feed cup mechanism which comprises a feed cup having first and second spaced-apart side walls that include respective ones of first and second inner surfaces, having a connecting wall that includes a curvilinear surface, having receiving opening means for receiving material to be fed, having discharge spout means for gravity discharging of material from said feed cup, and having drive shaft apertures that orthogonally and substantially coaxially intercept said side walls;

a drive shaft having an elongated longitudinal axis and being inserted through said drive shaft apertures;

a feed wheel having a metering circumferential surface, having a pair of planar side surfaces, being inserted into said feed cup intermediate of said first and second inner surfaces, and being drivingly mounted onto said drive shaft and cooperating with said curvilinear inner surface to form a metering passage between said metering circumferential surface and said curvilinear inner surface from said receiving opening means to said discharge spout means;

spacer means, having a planar spacing surface, having an outer surface portion that is substantially orthogonal to said planar spacing surface, having a drive shaft opening that orthogonally intercepts said planar spacing surface, and being interposed between one of said inner surfaces of said feed cup and one of said planar side surfaces of said feed wheel with said drive shaft extending through said drive shaft opening, for cooperating with said feed wheel to substantially fill the space between said inner surfaces of said feed cup;

pivoted seal means, being inserted intermediate of said first and second inner surfaces, being pivotally attached to said feed cup on a pivotal axis that is substantially parallel to said longitudinal axis, and having a swinging end that wings toward and into sealing proximity to both said metering circumferential surface of said feed wheel and said outer surface portion of said spacer means, for preventing said material from passing through said receiving opening means to said discharge spout means except through said metering passage; and means, comprising said outer surface portion of said spacer means, for preventing said swinging end of said pivoted seal means from contacting said metering circumferential surface of said feed wheel.

2. A feed cup mechanism as claimed in claim 1 in which said feed cup includes a top portion and a bottom portion;

said receiving opening means opens distal from said bottom portion;

said discharge spout means opens generally downwardly;

said feed cup includes a transversely disposed structural member that interconnects a portion of said side walls proximal to said receiving opening means, that extends upwardly from said pivoted seal means proximal to said pivoted attachment thereof, that includes a surface distal from said receiving opening means, and that cooperates with said pivoted seal means to prevent said material from passing from said receiving opening means to said discharge spout means above said pivoted seal means; and said pivoted seal means includes sealing tail means, extending under said structural member and extending upwardly along said distal surface for cooperating with said distal surface to seal any gap that may exist between said structural member and said pivoted seal means proximal to said pivoted attachment thereof.

3. A feed cup mechanism which comprises a feed cup having first and second spaced-apart side walls that include respective ones of first and second inner surfaces, having a bottom wall that includes a curvilinear inner surface, having receiving opening means for receiving material to be fed, having discharge spout opening means for gravity discharging of material from said feed cup, and having drive shaft apertures that orthogonally and substantially coaxially intercept said side walls;

a drive shaft having an elongated longitudinal axis and being inserted through said drive shaft apertures;

a feed wheel having a seed metering circumferential surface, having a pair of planar side surfaces, being inserted into said feed cup intermediate of said first and second inner surfaces, being drivingly mounted onto said drive shaft, and cooperating with said curvilinear inner surface to form a metering passage between said seed metering circumferential surface and said curvilinear inner surface from said receiving opening means to said discharge spout means;

means, comprising a spacer that includes a planar spacing surface, and comprising a second and interchangeable feed wheel having both a different diameter and a different width than that of the first said feed wheel, for selectivey changing the width of said metering passage, and for selectively changing the radial thickness of said metering passage intermediate of the selected one of said feed wheels and said curvilinear surface; and means, comprising an extension that projects orthogonally outwardly from said spacer distal from said planar spacing surface and that includes a drive shaft opening therethrough, for detachably securing said spacer to one of said walls of said feed cup by said extension resiliently engaging one of said drive shaft apertures.

4. A feed cup mechanism as claimed in claim 3 in which said spacer includes a planar spacing surface, an opposite surface, and an outer periphery that is intermediate of said surfaces, and a thickness between said surfaces that complements said narrower width of said feed wheel to substantially fill the space between said inner surfaces; and self-adjusting seal means, for cooperating with said seed metering circumferential surface and with said outer periphery distal from said metering passage to prevent said material from passing from said receivin opening means to said discharge spout means except through said meterng passage.

5. A feed cup mechanism as claimed in claim 4 in which said self-adjusting seal means comprises a pivoted seal having a swinging end, and being pivotally mounted to said feed cup distal from said swinging end on a pivot axis that is substantially parallel to said elongated longitudinal axis; and said cooperation of said self-adjusting seal means with said seed metering circumferential surface and said outer periphery comprises sealing proximity of said swinging end to said seed metering circumferential surface and to said outer periphery.

* * * * *